United States Patent Office 2,927,911
Patented Mar. 8, 1960

2,927,911

PROCESS FOR COPOLYMERIZING ACRYLIC COMPOUNDS WITH ACID SENSITIVE MONOMER

John L. Lang, Midland, Mich., assignor to The Dow Chemical Company, Midland, Mich., a corporation of Delaware No Drawing. Application March 7, 1955
Serial No. 492,763

11 Claims. (Cl. 260—80.3)

This invention relates to a method for making new and useful polymeric products from certain acrylic monomers and other unsaturated materials. More particularly it relates to making polymers from monovinyl ethers or from allyl alcohol and acrylic or methacrylic acid, or their amides.

Copolymers have been prepared from acrylic acid and monovinyl ethers or allyl alcohol. However, all of the prior processes for preparing such polymers have suffered from the disadvantage that the strongly acidic polymerization medium has caused the formation of aldehydes from the ether or alcohol. The formation of those aldehydes obviously reduces the yield of polymer produced, thus adding to the process costs. Likewise, the presence of such aldehydes in the final product has an adverse effect on such polymer properties as tensile strength, color and odor. However, the polymers have been found to be water-soluble and capable of depositing clear films from aqueous solution. It would therefore be desirable to find a polymerization process for preparing such polymers without the formation of aldehydes.

It is the principal object of this invention to provide an improved process for polymerizing acrylic or methacrylic acid (or their amides) and monovinyl ethers or allyl alcohol that will result in substantially aldehyde-free polymers.

The above and related objects are accomplished by means of a process whereby an acrylic monomer selected from the group of acrylic and methacrylic acids and their amides is copolymerized with a monovinyl ether or with allyl alcohol, in an aqueous medium at a pH of at least 7, in the presence of a salt capable of ionizing into sulfite, bisulfite, thiosulfate, or meta-bisulfite ions and a polymerization catalyst consisting of a water-soluble persulfate. Polymers prepared in accordance with this invention are substantially odorless and aldehyde-free and deposit clear and colorless continuous films from aqueous solution.

In carrying out the process of this invention it is preferable that the acrylic monomer, if normally acidic, be neutralized before the other ingredients are mixed together. By neutralizing before the monovinyl ether is added, the possibility of aldehyde formation due to acid hydrolysis of the ether is reduced to a minimum.

Any monovinyl ethers may be employed in the process. The vinyl alkyl ethers in which the alkyl group contains from 1 to 4 carbon atoms produce water-soluble polymers, and are preferred. When ethers are used in which the alkyl group has more than four carbon atoms, such as vinyl-2-ethylhexyl ether, the water solubility of the polymers is decreased appreciably. The term monovinyl ethers for purposes of this application includes vinyl alkyl ethers, such as vinyl ethyl ether, vinyl haloalkyl ethers, such as vinyl beta-chloroethyl ether and vinyl methoxyalkyl ethers.

The proportions of materials which may be used in this process may be varied within wide limits. The acrylic monomer may be used in amounts of from 50 to 90 percent by weight of the total polymerizable materials and the monovinyl ether in corresponding amounts of from 50 to 10 percent by weight. In addition, the inorganic salt should be present in amounts ranging from 0.5 to 10 percent by weight of the polymerizable materials.

The useful catalysts are water-soluble persulfates, and potassium persulfate is preferred. Such other conventional water-soluble catalysts as hydrogen peroxide, and such water-insoluble catalysts as benzoyl peroxide, are not useful in the present process.

It is usually not necessary to heat the polymerization charge because enough heat is provided from the heats of solution of the caustic soda and neutralization of the acid to raise the temperature of the charge to a point where polymerization is initiated. However, when acrylamide or the sodium salt of the acid is used, it is usually preferable to warm the polymerization charge to about 40° C. to initiate polymerization. In any case, the temperature should be maintained at normal polymerization temperatures, such as from 40° C. to 60° C. during the polymerization.

The polymers produced in accordance with this invention find utility in a wide variety of applications. The water-soluble polymers may be cast into useful clear films, may be employed as textile sizing materials, may be used in coagulating suspensions of soil such as kaolin or may be used as thickeners. The insoluble polymers, when converted to the free acid form, are capable of being extruded as coils or fibers.

The process of the invention will be more apparent from the following illustrative examples in which all parts are by weight.

*Example 1*

Into a polymerization vessel were placed 30 parts of acrylic acid to which was added enough aqueous caustic soda to raise the pH to 8. To the above were added 20 parts of vinyl ethyl ether, 2.0 parts sodium sulfite and 1.0 part potassium persulfate. Enough water was added to make the total amount of water 100 parts. Polymerization was initiated by heating the charge to 50° C. After 16 hours the product was a viscous, water-clear polymer solution. When the solution was cast onto a glass plate and dried, a clear, continuous film resulted. The principal utility of the product is as a textile size.

By way of contrast, when it was attempted to prepare the same copolymer, using a similar process but omitting the sodium sulfite, a brown copolymer resulted which was much less soluble in water. The films deposited from the aqueous solution were very weak.

*Example 2*

The process of Example 1 was repeated except that 20 parts of allyl alcohol were used in place of the vinyl ethyl ether. After polymerization a water-clear viscous solution resulted from which was deposited a continuous film. The water solution was useful as a warp size in textile operations with either natural or synthetic fibers.

*Example 3*

In a manner similar to that of Example 1 polymers were prepared in which vinyl 2-ethyl hexyl ether was used in place of the vinyl ethyl ether. The polymerization charge was agitated during polymerization and resulted in a latex-like dispersion of the polymeric material. The dispersion was allowed to settle, decanted, and the polymer dried. After acidification and redrying the resulting polymer was compression molded into thin plates which were water-clear.

In similar manner polymers were produced using potassium meta-bisulfite, sodium bisulfite, and sodium thiosulfate in place of the sodium sulfite. In all cases, the polymers were compression molded and gave clear products.

*Example 4*

A polymerization mixture consisting of 50 parts acrylamide and 12 parts vinyl ethyl ether was stirred into 100 parts water. To the above was added 1.0 part potassium persulfate and 2.0 parts potassium meta-bisulfite. Polymerization was initiated by heating the charge to 40° C. After 16 hours a viscous solution was obtained from which the polymer was isolated by the addition with stirring of an equal volume of dioxane. The isolated polymer was water-soluble after drying, and was useful as a soil conditioner and slime flocculating agent.

I claim:

1. The method which comprises providing an aqueous dispersion of an acrylic compound from the group consisting of acrylic acid, methacrylic acid, and the amides of such acids, adjusting the pH of the aqueous dispersion to the range from 7 to 14, adding to the resulting aqueous solution from 50 to 10 parts by weight, for each 50 to 90 parts, respectively, of the acrylic compound, of a member of the group consisting of vinyl alkyl ethers, vinyl monohaloalkyl ethers, vinyl methoxyalkyl ethers, and allyl alcohol, and from 0.5 to 10 percent, based on the combined weight of unsaturated compounds, of a water-soluble inorganic salt from the group consisting of sulfites, bisulfites, metabisulfites and thiosulfates, and subjecting the resulting mixture to polymerizing conditions in contact with a catalytic amount of a water-soluble persulfate until polymerization is substantially complete.

2. The method claimed in claim 1, wherein the acrylic compound employed is acrylic acid.

3. The method claimed in claim 1, wherein the acrylic compound employed is methacrylic acid.

4. The method claimed in claim 1, wherein the acrylic compound employed is acrylamide.

5. The method claimed in claim 1, wherein the compound copolymerized with the acrylic compound is vinyl ethyl ether.

6. The method claimed in claim 1, wherein the compound copolymerized with the acrylic compound is vinyl 2-ethyl hexyl ether.

7. The method claimed in claim 1, wherein the compound copolymerized with the acrylic compound is allyl alcohol.

8. The method claimed in claim 1, wherein the inorganic compound is sodium sulfite.

9. The method claimed in claim 1, wherein the inorganic compound is sodium thiosulfate.

10. The method claimed in claim 1, wherein the inorganic compound is potassium metabisulfite.

11. The method claimed in claim 1, wherein the inorganic compound is sodium bisulfite.

References Cited in the file of this patent

UNITED STATES PATENTS

| | | |
|---|---|---|
| 2,016,490 | Fikentscher | Oct. 8, 1935 |
| 2,462,354 | Brubaker et al. | Feb. 22, 1949 |
| 2,543,636 | Loritsch | Feb. 27, 1951 |
| 2,572,028 | Hunt | Oct. 23, 1951 |